US008612881B2

(12) United States Patent
Kim et al.

(10) Patent No.: US 8,612,881 B2
(45) Date of Patent: Dec. 17, 2013

(54) WEB PAGE CONTENT DISCOVERY

(75) Inventors: Jane T. Kim, Seattle, WA (US); Benjamin N. Truelove, Lynwood, WA (US); Miladin Pavlicic, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 12/190,651

(22) Filed: Aug. 13, 2008

(65) Prior Publication Data

US 2010/0042948 A1    Feb. 18, 2010

(51) Int. Cl.
*G06F 3/048* (2013.01)

(52) U.S. Cl.
USPC .......................................... 715/785; 715/787

(58) Field of Classification Search
USPC .......................................... 715/751, 785, 787
See application file for complete search history.

(56) References Cited

U.S. PATENT DOCUMENTS

| | | | |
|---|---|---|---|
| 6,964,009 B2 | 11/2005 | Samaniego et al. | |
| 7,587,276 B2* | 9/2009 | Gold et al. | 701/211 |
| 8,130,205 B2* | 3/2012 | Forstall et al. | 345/173 |
| 2004/0123242 A1 | 6/2004 | McKibben et al. | |
| 2006/0200740 A1 | 9/2006 | Kahn et al. | |
| 2006/0288011 A1* | 12/2006 | Gandhi et al. | 707/10 |
| 2007/0033517 A1* | 2/2007 | O'Shaughnessy et al. | 715/501.1 |
| 2007/0067305 A1* | 3/2007 | Ives | 707/10 |
| 2007/0100836 A1* | 5/2007 | Eichstaedt et al. | 707/10 |
| 2007/0159651 A1 | 7/2007 | Disario et al. | |
| 2007/0162845 A1* | 7/2007 | Cave et al. | 715/530 |
| 2007/0204308 A1* | 8/2007 | Nicholas et al. | 725/86 |
| 2007/0225047 A1 | 9/2007 | Bakos | |
| 2007/0240039 A1* | 10/2007 | Hosotsubo | 715/517 |
| 2007/0250510 A1 | 10/2007 | Nachman | |
| 2008/0010294 A1 | 1/2008 | Norton et al. | |
| 2008/0046537 A1 | 2/2008 | Chasen et al. | |
| 2008/0065737 A1* | 3/2008 | Burke et al. | 709/217 |
| 2008/0104535 A1* | 5/2008 | DeLine et al. | 715/785 |
| 2008/0126476 A1* | 5/2008 | Nicholas et al. | 709/203 |
| 2008/0134084 A1* | 6/2008 | Clark et al. | 715/808 |
| 2008/0148178 A1* | 6/2008 | Read et al. | 715/787 |
| 2008/0155118 A1* | 6/2008 | Glaser et al. | 709/238 |
| 2008/0160967 A1* | 7/2008 | Narasimhan et al. | 455/414.1 |
| 2010/0083158 A1* | 4/2010 | Adler et al. | 715/771 |
| 2010/0088121 A1* | 4/2010 | Shih et al. | 705/3 |

OTHER PUBLICATIONS

"Subscribing to Content with WebSlices", retrieved at <<http://msdn.microsoft.com/en-us/library/cc196992(VS.85).aspx#_discovery>>, Microsoft Corporation 2008, pp. 10.

(Continued)

*Primary Examiner* — Enrique Iturralde
(74) *Attorney, Agent, or Firm* — Wolfe-SBMC

(57) ABSTRACT

Various embodiments enable discovery of functionality associated with a webpage's content. In at least some embodiments, a user interface instrumentality can be automatically presented to a user to inform the user of functionality associated with content appearing on a webpage. The user interface instrumentality can, in some instances, reside in the form of a clickable button that is automatically presented when a user moves their cursor on or near a particular piece of webpage content. By clicking on the presented button, the user can access functionality associated with the particular piece of webpage content. In at least some other embodiments, a browser's chrome includes a discovery button that provides a listing of items that have functionality that can be performed relative to the items.

20 Claims, 9 Drawing Sheets

(56) References Cited

OTHER PUBLICATIONS

"Discover New Content with Me.dium's IE8 Add-ons", retrieved at <<https://me.dium.com/ie8/>>, p. 1.
"IE8 Beta Download", retrieved at <<http://blandname.com/2008/03/06/ie8-beta-download/>>, Mar. 6, 2008, pp. 2.
"Webchunks 0.12 : Webslices for Any Web Site . . . ", retrieved at http://www.glazman.org/weblog/dotclear/index.php?post/2008/03/21/Webchunks-012-%3A-Webslices-for-any-web-site>>, Mar. 21, 2008, pp. 2.
"Discover New Content with Me.dium's IE8 Add-ons", Retrieved from <http://me.dium.com/ie8/> on May 27, 2008, (Mar. 9, 2008), 1 page.

\* cited by examiner

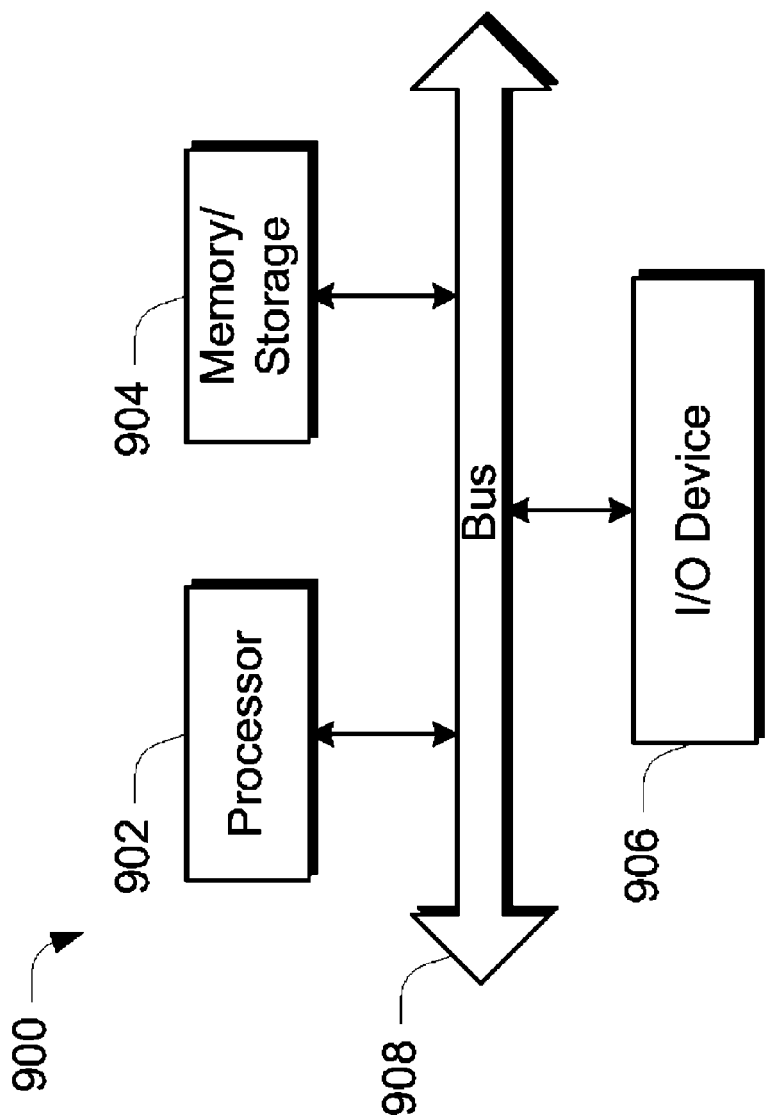

WEB PAGE CONTENT DISCOVERY

BACKGROUND

Webpages can contain many different types of content that can be useful for a user. For example, a restaurant webpage might contain the restaurant's name, a description of menu items, the restaurant's address and phone number. A user who browses to the restaurant's webpage may wish to consume this content in different ways. For example, the user may wish to have the restaurant's address mapped for them so that they know where the restaurant is located. Additionally, the user may wish to add the restaurant's address to an address book for future reference. To access these types of functionalities and others, a user typically performs some action, such as copying relevant data, outside of the context of the webpage that they are currently viewing. This creates additional user actions outside of the user's Web browser context.

In addition, some webpages can include content that serves as a foundation for functionality that can be provided by a Web browser. For example, some webpages can include content to which a user can subscribe, such as RSS content. Yet, accessing this functionality may not be very intuitive for some users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable discovery of functionality associated with a webpage's content. In at least some embodiments, a user interface instrumentality can be automatically presented to a user to inform the user of functionality associated with content appearing on a webpage. The user interface instrumentality can, in some instances, reside in the form of a clickable button that is automatically presented when a user moves their cursor on or near a particular piece of webpage content. Alternately or additionally, the user interface instrumentality can reside in the form of a visual border that highlights the webpage content. By clicking on the presented button, the user can access functionality associated with the particular piece of webpage content.

In at least some other embodiments, a browser's chrome includes a discovery button that provides a listing of items that have functionality that can be performed relative to the items.

BRIEF DESCRIPTION OF THE DRAWINGS

The same numbers are used throughout the drawings to reference like features.

FIG. 9 is a block diagram of a system in accordance with one or more embodiments.

DETAILED DESCRIPTION

Overview

Various embodiments enable discovery of functionality associated with a webpage's content. In at least some embodiments, a user interface instrumentality can be automatically presented to a user to inform the user of functionality associated with content appearing on a webpage. The functionality can comprise any suitable type of functionality that can be performed relative to content appearing on a webpage. For example, the functionality can include such things as map functionality, definition functionality, copy functionality, e-mail functionality and the like. Various embodiments described below are described in the context of subscription functionality which can enable a user to subscribe to content, such as RSS content, appearing on a webpage.

The user interface instrumentality can, in some instances, reside in the form of a clickable button that is automatically presented when a user moves their cursor on or near a particular piece of webpage content. By clicking on the presented button, the user can access functionality associated with the particular piece of webpage content. Alternately or additionally, the user interface instrumentality can reside in the form of a visual border that highlights the webpage content. Alternately or additionally, the user interface instrumentality can comprise some type of audible notification, such as a beep or other sound, or physical notification such as a force feedback in the form of a vibration provided through a user's input device.

In at least some other embodiments, a browser's chrome includes a discovery button that provides a listing of items that have functionality that can be performed relative to the items.

In the discussion that follows, a section entitled "Operating Environment" describes but one environment in which the various embodiments can be employed. Following this, a section entitled "In-Document Content Discovery" describes an embodiment in which content in a webpage can be discovered. Next, a section entitled "Discovery Button-Example" describes an example embodiment in which a discovery button in a Web browser can be used to notify a user of content to which the user can subscribe. Last, a section entitled "Example System" is provided and describes an example system that can be used to implement one or more embodiments.

Operating Environment

Figure 1:
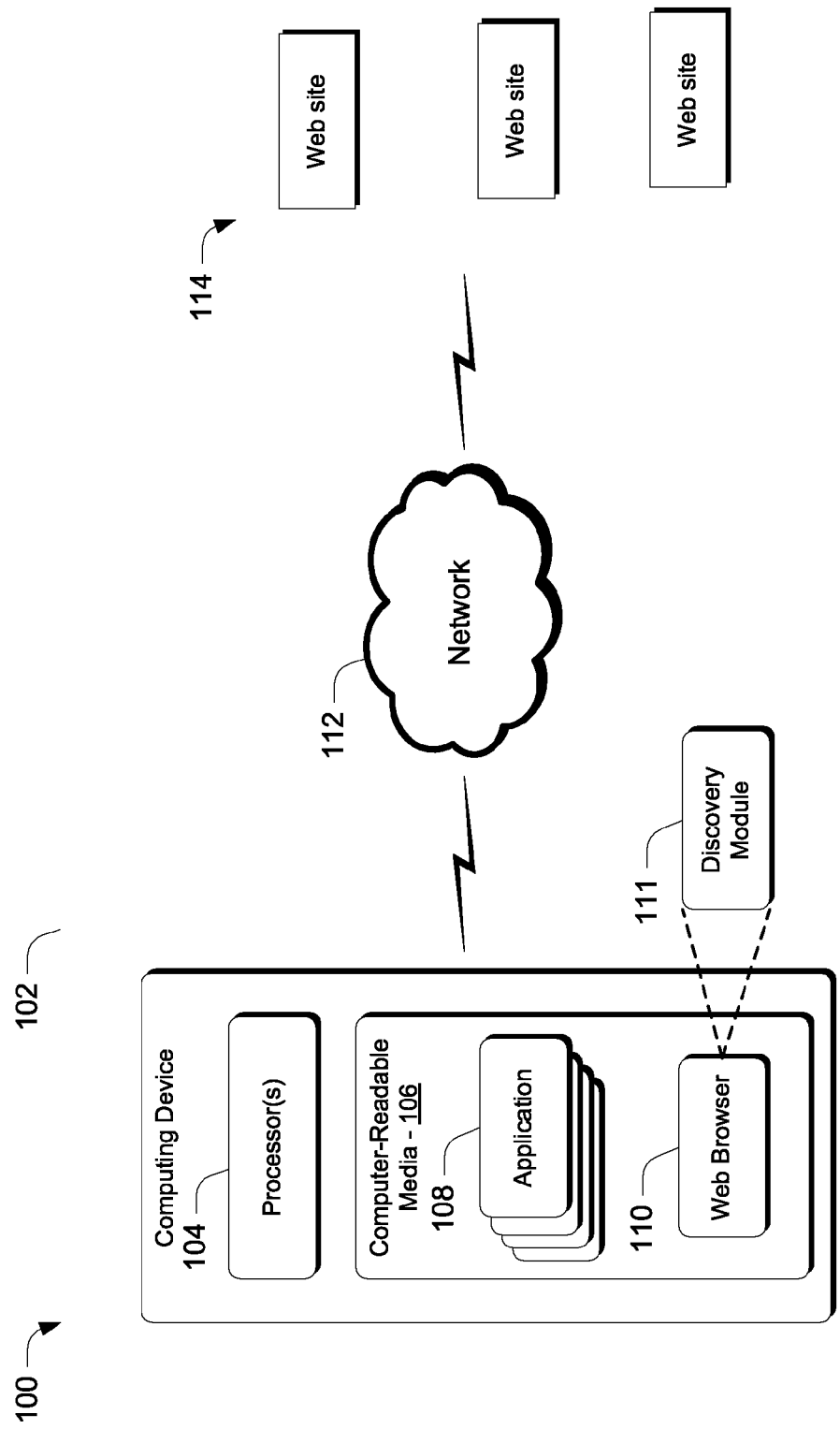
FIG. 1 illustrates an operating environment in which the inventive principles can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). Applications 108 can include any suitable type of application such as, by way of example and not limitation, reader applications, e-mail applications, instant messaging applications, and a variety of other applications. An application in the form of a Web browser 110 can include or otherwise make use of a discovery module 111 that operates as described above and below. The discovery module can enable a user to discover functionality associated with content appearing on a webpage.

The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 9.

In addition, environment 100 includes a network 112, such as the Internet, and one or more web sites 114 from and to which content can be received and sent.

Computing device 102 can be embodied as any suitable computing device such as, by way of example and not limitation, a desktop computer, a portable computer, a handheld computer such as a personal digital assistant (PDA), cell phone, and the like.

Having considered an example operating environment, consider now a discussion of an embodiment in which in-document content discovery can be used to enable access to functionality associated with content that appears in a webpage.

In-Document Content Discovery

In one or more embodiments, a user interface instrumentality can be automatically presented to a user to inform the user of functionality associated with content appearing on a webpage. As noted above, the functionality can comprise any suitable type of functionality that can be performed relative to content appearing on a webpage. For purposes of the discussion below, subscription functionality is described that can enable a user to subscribe to content, such as RSS content, appearing on a webpage.

Figure 2:
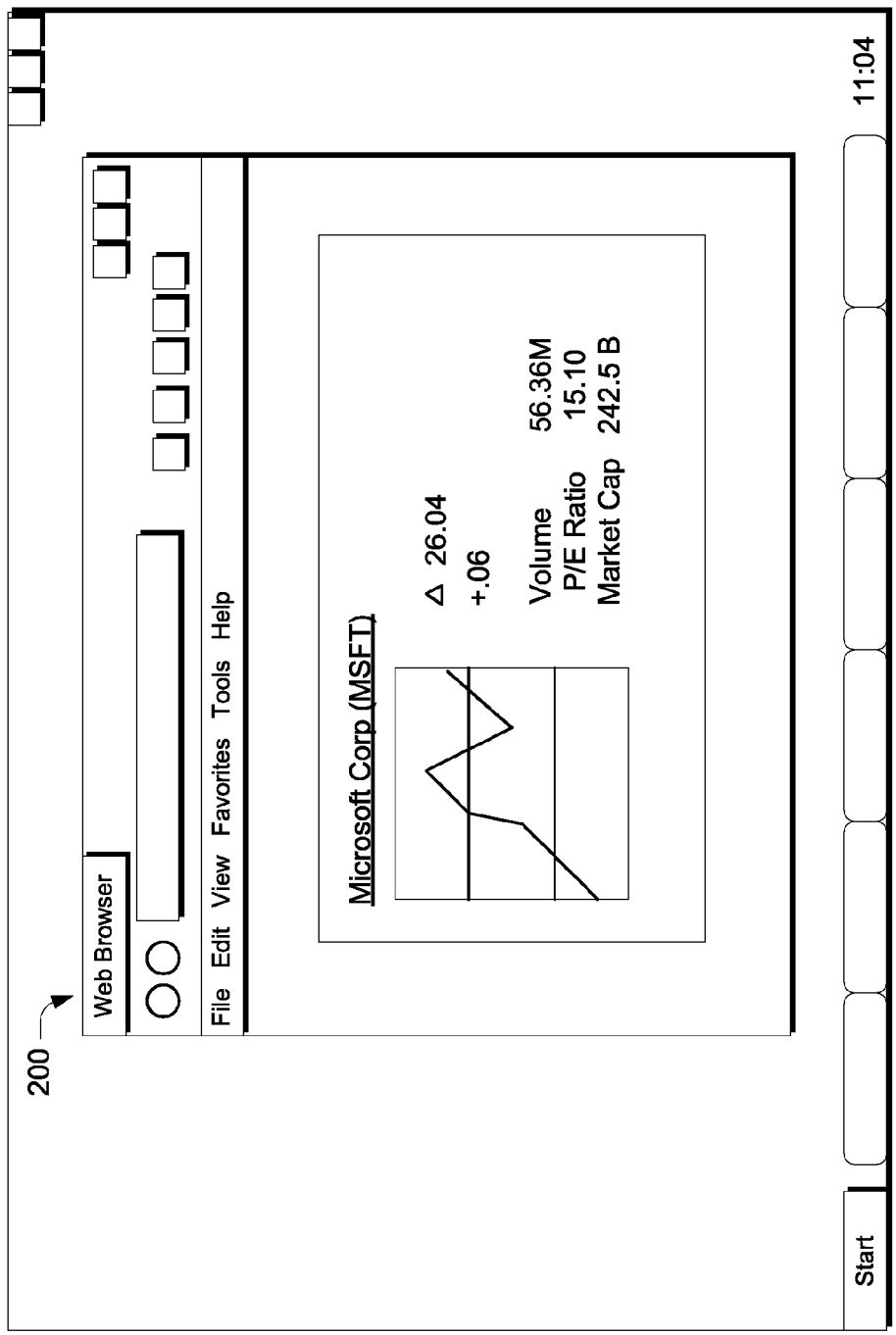
FIG. 2 illustrates a Web browser user interface in accordance with one or more embodiments.

As an example, consider FIG. 2. There, a Web browser user interface is shown generally at 200 and includes a webpage having a stock graph for Microsoft Corporation. In this particular example, assume that some of the displayed content includes content to which a user can subscribe. For example, a user may wish to subscribe to updates to stock prices for a particular company.

Figure 3:
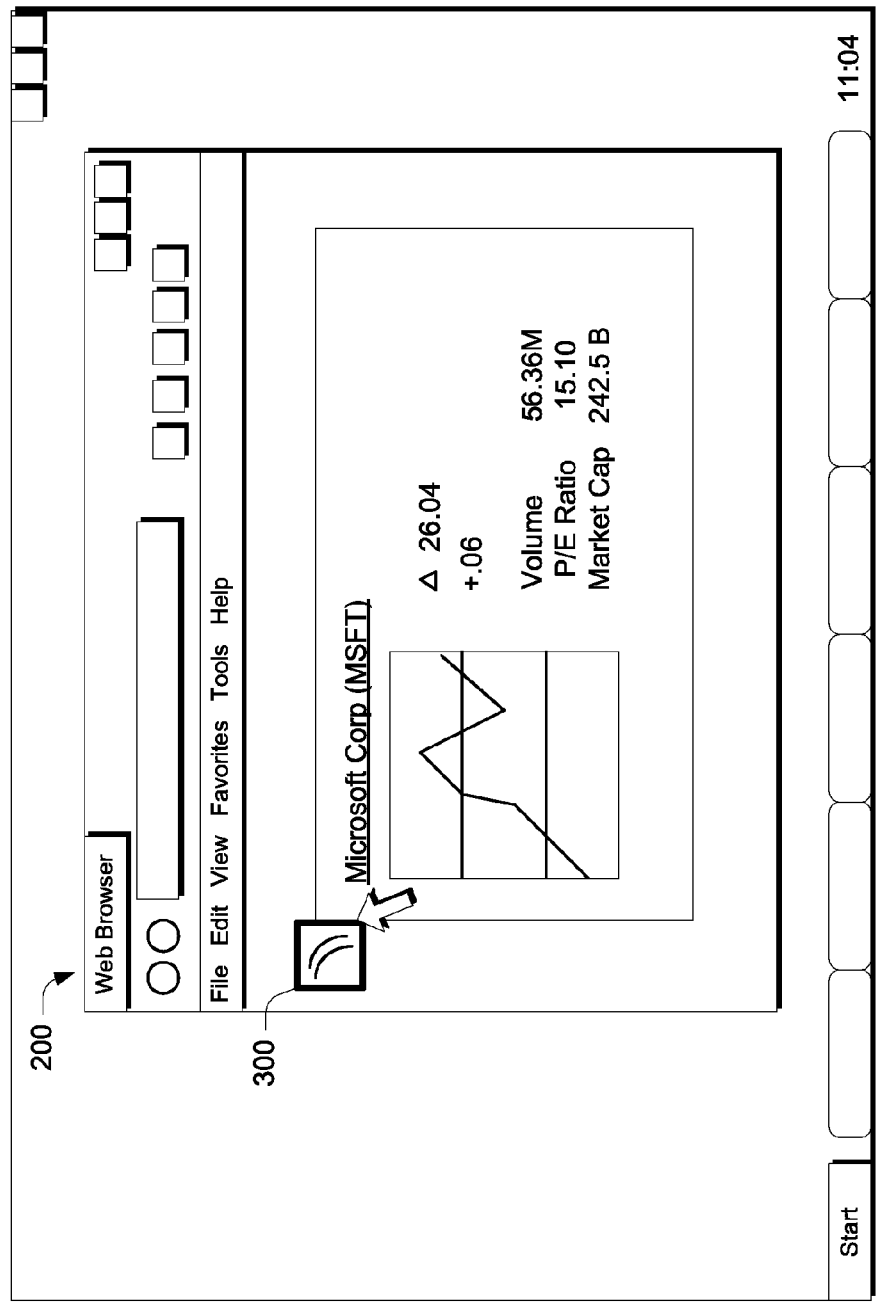
FIG. 3 illustrates a Web browser user interface in accordance with one or more embodiments.
Figure 4:
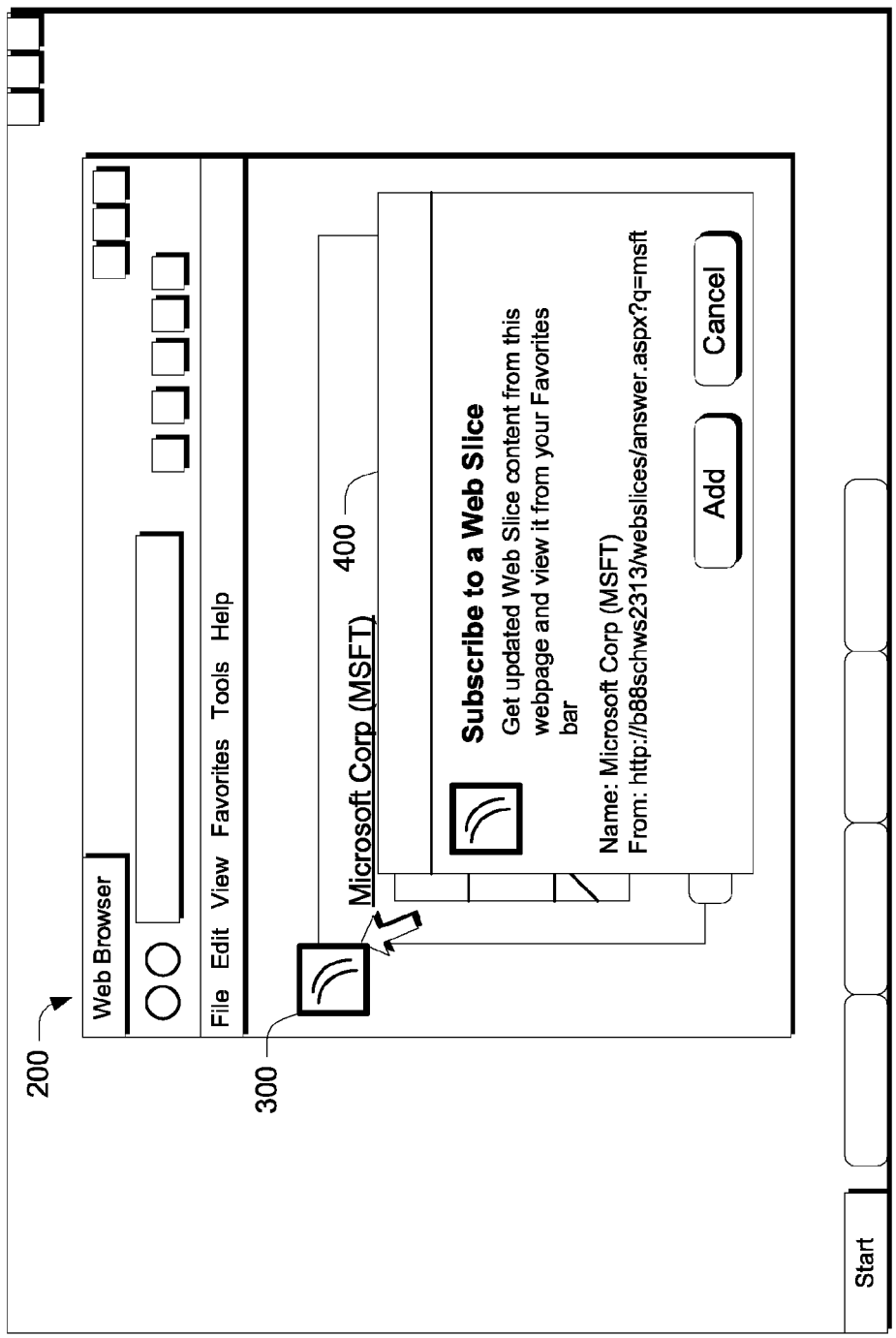
FIG. 4 illustrates a Web browser user interface in accordance with one or more embodiments.

Referring to FIG. 3, the user has positioned their cursor on or near content to which they can subscribe. Responsively, the Web browser automatically displays a user interface instrumentality 300 in the form of a clickable button that can be clicked on by the user to subscribe to the content. Alternately or additionally, other user interface instrumentalities can be presented such as those described above and below. In one or more embodiments, a user can be automatically subscribed to the content by simply clicking on the user interface instrumentality 300. Alternately or additionally, the user can be presented with a subscription dialog that allows the user to ascertain the content to which they are to be subscribed, as well as other information. Further, in embodiments where multiple different types of functionality may be available for a particular piece of content, a menu of selectable functionality can be displayed by hovering or positioning a cursor over or near the content. As an example of a dialog presentation, consider FIG. 4.

There, a dialog 400 is presented to the user and includes information about the content to which the user wishes to subscribe, as well as an Add button and a Cancel button. By clicking on the Add button, the user can subscribe to the content appearing on the webpage. Any suitable type of subscription model can be utilized to enable the user to subscribe to content. For example, in at least some embodiments, a URL associated with the content to which a subscription is desired can be saved in a local store. Periodically, the Web browser or some other component can access the URL and then check to see if there has been an update with respect to the content to which a subscription has occurred. If there has been an update, the Web browser can retrieve the updated content, save it to the local store, and notify the user, through a suitable user interface instrumentality, that an update has occurred. The user can then access the updated content using the Web browser.

In one or more embodiments, the Web browser is able to ascertain whether content appearing on a webpage can be subscribed to by the user by examining HTML code that describes the webpage. The HTML code is typically provided by the publisher of the webpage and is retrieved when a Web browser navigates to the webpage. An example of HTML code that can be used by a Web browser is provided just below:

```
<div class= "hslice" id= "1">
    <p class= "entry-title">Game System -- $66.00</p>
    <div class= "entry-content">
        <img src= "game.jpg">
    </div>
</div>
```

This HTML code references an "hslice" with an associated ID. The "hslice" reference indicates that the associated content is content to which a user can subscribe. The ID associated with the "hslice" reference is incorporated in an URL that is stored in a local store and is used to identify the specific content to which the user may subscribe. The "entry-title" is the title of the content and the "src" reference refers to an image that can accompany the content.

When the Web browser receives a new webpage, it parses the HTML code associated with the webpage and identifies any "hslice" references occurring in the HTML code. Now, when the user moves or hovers their cursor on or near the associated content, the Web browser can present a user interface instrumentality, such as user interface instrumentality 300, that notifies the user that they can subscribe to this content. As noted above, other user interface instrumentalities can be utilized. For example, in at least some embodiments an audible sound can inform the user that there is subscribe-able content on a webpage. Such can be useful in instances where a user may be visually impaired. Alternately or additionally, a user interface instrumentality in the form of a physical feedback mechanism, such as a vibration through the user's input device, can inform the user that there is subscribed-able content on a webpage.

Figure 5:
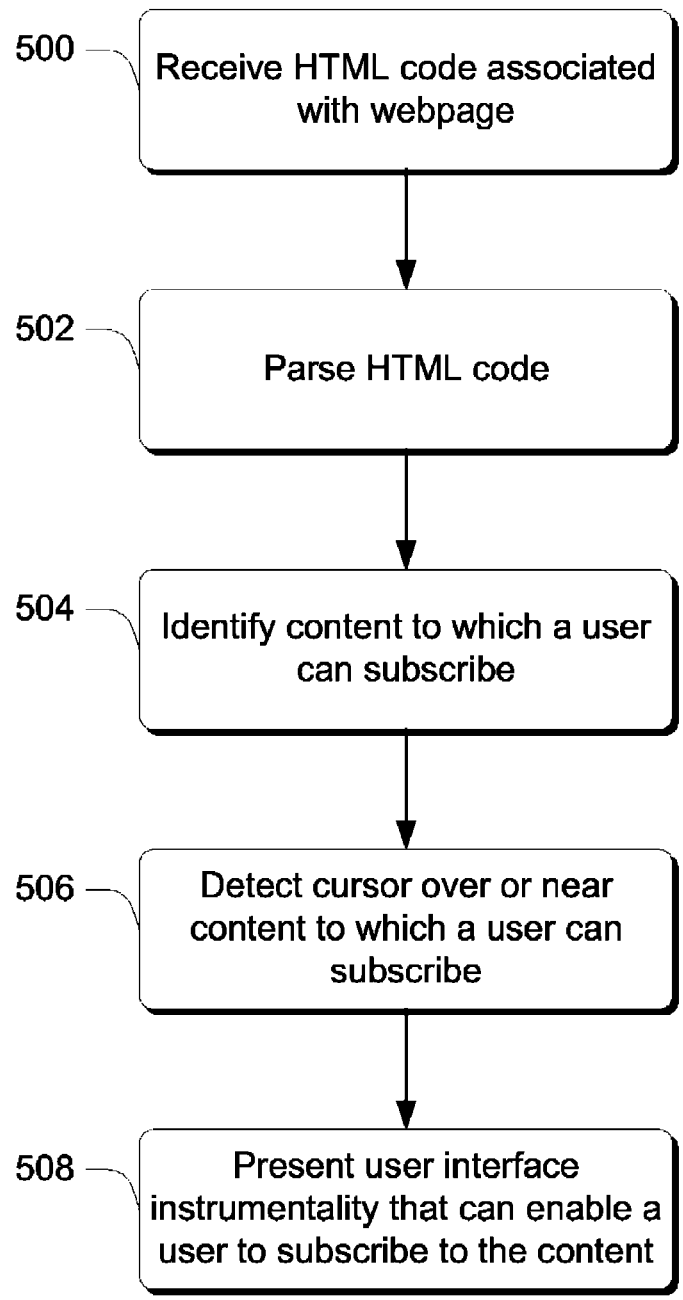
FIG. 5 is a flow diagram that describes steps in a method in accordance with one or more embodiments.

FIG. 5 is a flow diagram that describes steps in a method in accordance with one or more embodiments. The method can be performed in connection with any suitable hardware, software, firmware, or combination thereof. In at least some embodiments, the method can be performed by a suitably-configured Web browser such as the Web browser described above in FIG. 1.

Step 500 receives HTML code associated with a webpage. This step can be performed when a Web browser navigates to a particular webpage. Step 502 parses the HTML code and step 504 identifies content to which a user can subscribe. This step can be performed in any suitable way. For example, the HTML code associated with the webpage can identify content to which a user can subscribe. One example of how this can be done is provided just above.

Step 506 detects a cursor over or near content to which a user can subscribe. Responsive to detecting the cursor over or near content to which the user can subscribe, step 508 presents a user interface instrumentality that can enable the user to subscribe to the content. In one or more embodiments, detection of the cursor and subsequent presentation of the user interface instrumentality is performed independent of and/or without a user actually clicking or otherwise selecting the content. Any suitable user interface instrumentality can be used. For example, in at least some embodiments the user interface instrumentality resides in the form of a clickable button that can enable user to subscribe to the content. The clickable button can, in some embodiments, automatically subscribe the user to the content. In other embodiments, the clickable button can be clicked to present a dialog that then enables the user to subscribe to the content. In other embodiments, the user interface instrumentality comprises an audible sound that can then enable the user to subscribe to content by initiating a subscription process through their Web browser. Likewise, in other embodiments, the user interface instrumentality can comprise a physical feedback mechanism that can then enable the user to subscribe to content by initiating a subscription process through their Web browser.

Having described example embodiments in which in-document content discovery can occur, consider now an embodiment in which a user can be notified of content to which they can subscribe in a more global fashion. Specifically, in the embodiment described just below, the user can be notified of content to which they can subscribe through the use of a discovery button that appears in the chrome of their Web browser.

Discovery Button-Example

Figure 6:
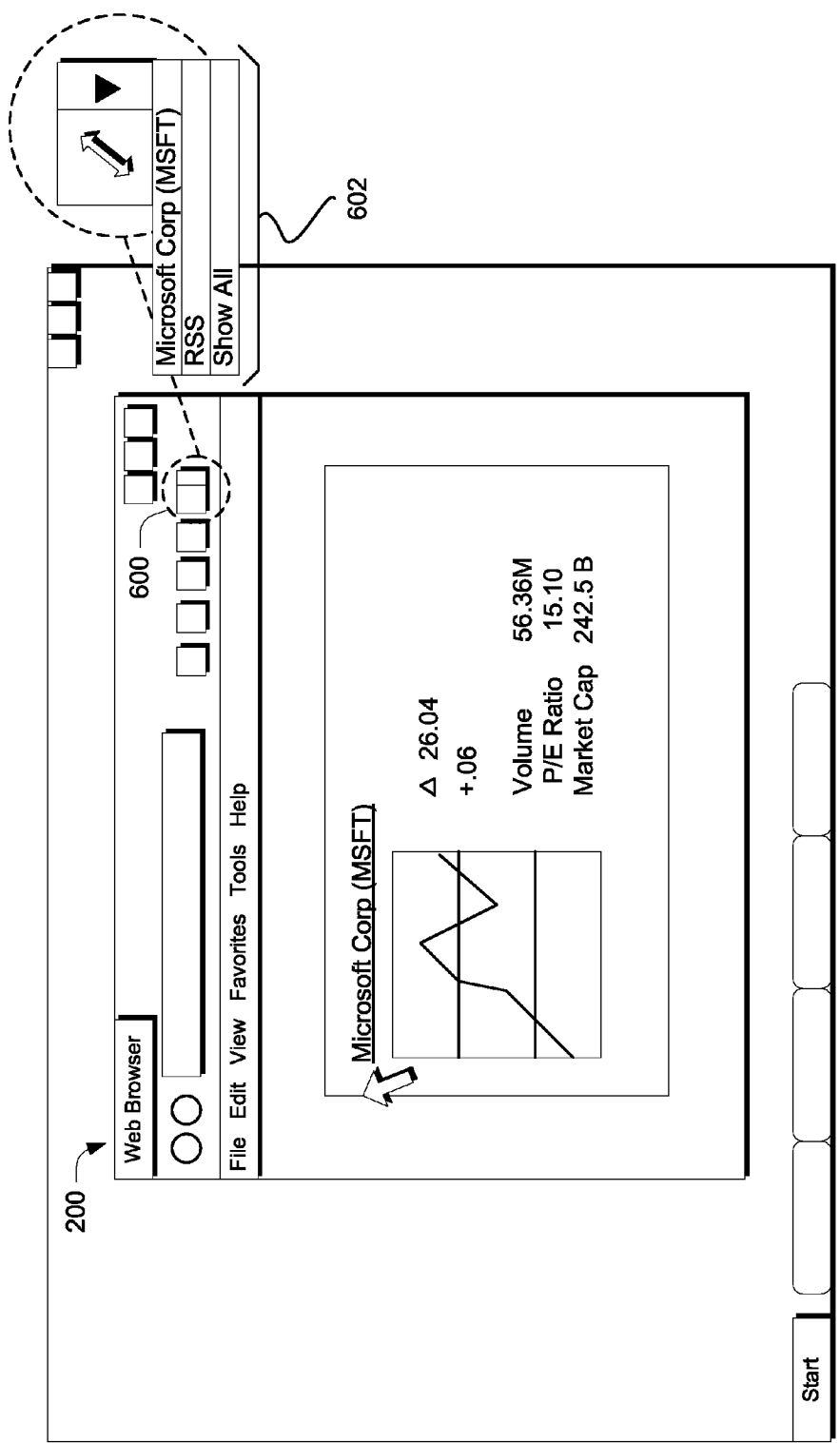
FIG. 6 illustrates a Web browser user interface in accordance with one or more embodiments.

FIG. 6 illustrates a Web browser user interface generally at 200. In this example, user interface 200 includes a discovery button 600 which is shown in expanded form just to the right of the figure. Here, the discovery button 600 includes a drop-down menu feature which can list multiple pieces of content on a webpage to which a user can subscribe. Specifically, when the Web browser receives HTML code, it parses the HTML code as in the above example and identifies content to which a user can subscribe. Responsively, when there is content to which a user can subscribe on a particular webpage, the Web browser can notify the user by changing the color of the discovery button 600. If a user so chooses, they can use the drop-down menu feature to see a list of all of the content on a particular page to which they can subscribe. In this particular example, the content to which the user can subscribe is identified by "Microsoft Corp (MSFT)" and "RSS". In this way, a user can be informed of content to which they can subscribe in more of a global fashion.

In one or more embodiments, the Web browser can be configured to automatically scroll to associated content on a webpage based on a user action relative to the drop-down menu feature. That is, in many instances, a webpage can contain multiple pieces of content to which a user can subscribe. These pieces of content can be distributed throughout a webpage in a manner such that all of the pieces of content are not viewable at once. In these instances, and others, when a user moves their cursor on or near a drop-down menu entry, the Web browser can automatically scroll to the associated content on the webpage thus identifying for the user the associated content. To subscribe to the associated content the user can either click on the drop-down menu entry to be exposed to a subscription experience or, alternately, can hover their cursor on or near the associated content on the webpage as in the above example. Alternately or additionally, the webpage can be mapped in a thumbnail that shows various locations at which subscribable content resides.

Figure 7:
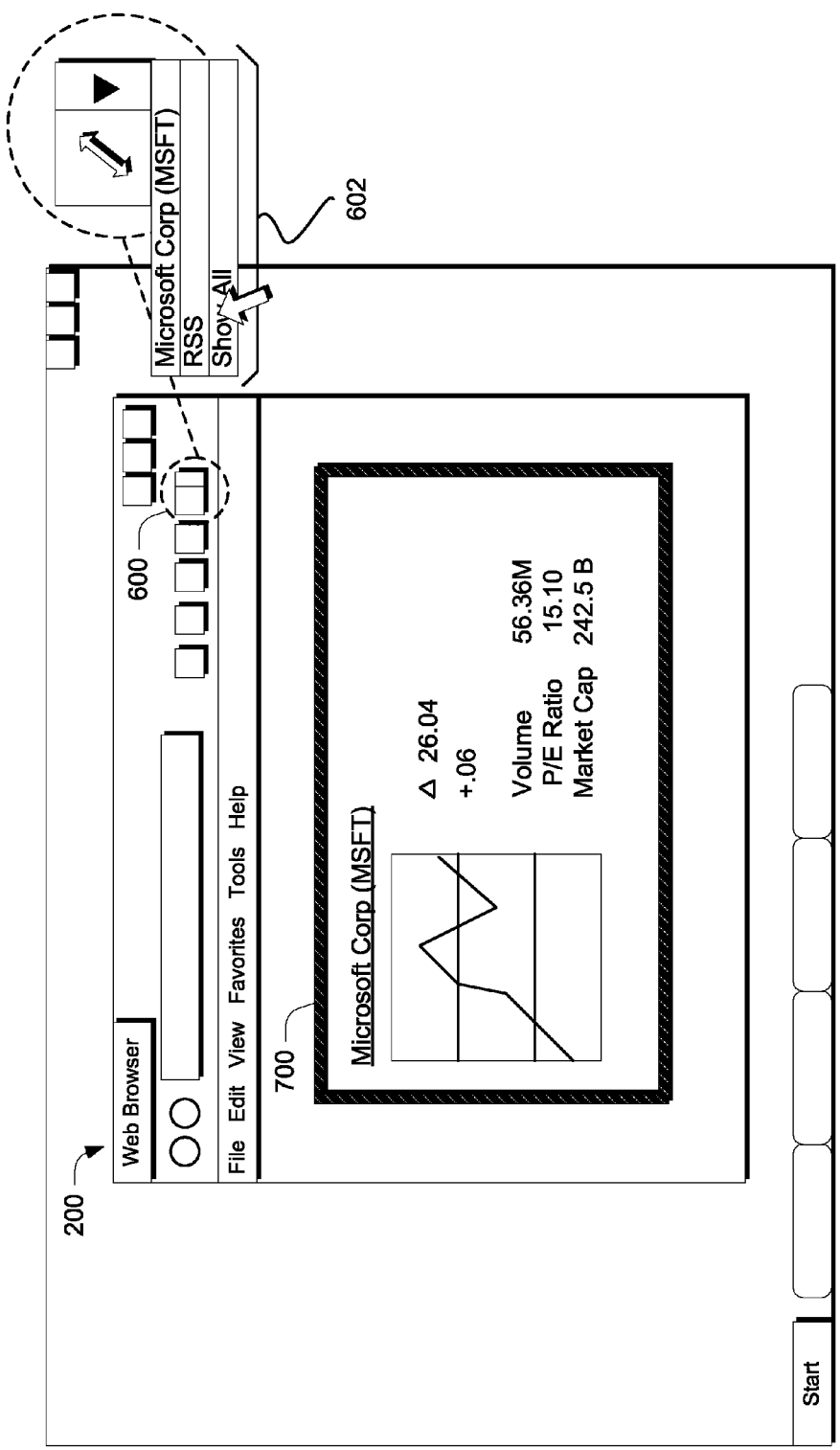
FIG. 7 illustrates a Web browser user interface in accordance with one or more embodiments.

In one or more embodiments, a "show all" feature is provided as part of the drop-down menu feature. In these embodiments, if a user clicks on the "show all" feature in the drop-down menu, the Web browser can visually highlight all of the content on the webpage to which a user can subscribe. Visual highlighting can occur in all of the embodiments described in this document. As an example, consider FIG. 7.

There, the user has clicked on the "show all" feature and, responsively, a visual border 700 is provided around content to which the user can subscribe. As noted above, because a webpage can contain multiple pieces of content to which a user can subscribe, multiple different associated visual borders can be provided as well. This can enable a user to quickly visually ascertain all of the content on a particular webpage to which they can subscribe. Now, by moving their cursor over or near such content, they can be exposed to a subscription experience such as that described above.

Figure 8:
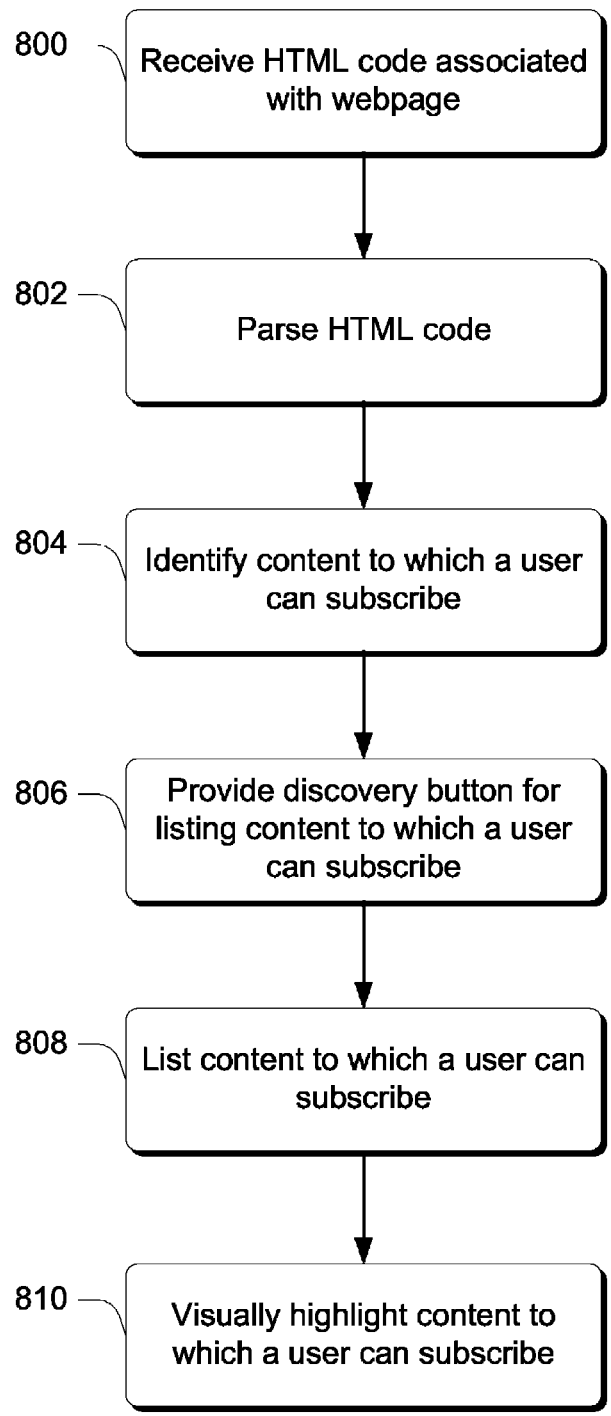
FIG. 8 is a flow diagram that describes steps in a method in accordance with one or more embodiments.

FIG. 8 is a flow diagram that describes steps in a method in accordance with one or more embodiments. The method can be performed in connection with any suitable hardware, software, firmware, or combination thereof. In at least some embodiments, the method can be performed by a suitably-configured Web browser such as the Web browser described above in FIG. 1.

Step 800 receives HTML code associated with a webpage. This step can be performed when a Web browser navigates to a particular webpage. Step 802 parses the HTML code and step 804 identifies content to which a user can subscribe. This step can be performed in any suitable way. For example, the HTML code associated with the webpage can identify content to which a user can subscribe. One example of how this can be done is provided above.

Step 806 provides a discovery button for listing content to which a user can subscribe. The discovery button can be provided at any suitable location on a Web browser's user interface. In the example described just above, the discovery button is provided in the Web browser's chrome. Step 808 lists content to which a user can subscribe. This step can be performed in any suitable way. For example, in at least some embodiments, this step can be performed responsive to a user clicking on the discovery button to access a drop-down menu feature that lists content to which the user can subscribe.

In at least some embodiments, step 810 can visually highlight content to which a user can subscribe. This step can be performed in any suitable fashion. For example, in some embodiments the content can be visually highlighted responsive to a user clicking on a menu item in a drop-down menu feature. One such item was described above in the form of a "show all" feature.

Once the content has been listed for the user, the user can select particular content to which they wish to subscribe. Responsively, the user can be guided through a subscription process such as that described above.

Having described various embodiments in which a user can access functionality associated with content on a webpage, consider now a discussion of an example system that can be utilized to implement the embodiments described above.

Example System

FIG. 9 illustrates an example computing device 900 that can implement the various embodiments described above. Computing device 900 can be, for example, computing device 102 of FIG. 1 or any other suitable computing device.

Computing device 900 includes one or more processors or processing units 902, one or more memory and/or storage components 904, one or more input/output (I/O) devices 906, and a bus 908 that allows the various components and devices to communicate with one another. Bus 908 represents one or more of any of several types of bus structures, including a memory bus or memory controller, a peripheral bus, an accelerated graphics port, and a processor or local bus using any of a variety of bus architectures. Bus 908 can include wired and/or wireless buses.

Memory/storage component 904 represents one or more computer storage media. Component 904 can include volatile media (such as random access memory (RAM)) and/or non-volatile media (such as read only memory (ROM), Flash memory, optical disks, magnetic disks, and so forth). Component 904 can include fixed media (e.g., RAM, ROM, a fixed hard drive, etc.) as well as removable media (e.g., a Flash memory drive, a removable hard drive, an optical disk, and so forth).

One or more input/output devices 906 allow a user to enter commands and information to computing device 900, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments enable discovery of functionality associated with a webpage's content. In at least some embodiments, a user interface instrumentality can be automatically presented to a user to inform the user of functionality associated with content appearing on a webpage. The user interface instrumentality can, in some instances, reside in the form of a clickable button that is automatically presented when a user moves their cursor on or near a particular piece of webpage content. By clicking on the presented button, the user can access functionality associated with the particular piece of webpage content.

In at least some other embodiments, a browser's chrome includes a discovery button that provides a listing of items that have functionality that can be performed relative to the items.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter

What is claimed is:

1. A computer-implemented method comprising:
receiving HyperText Markup Language (HTML) code associated with a webpage;
parsing the HTML code to identify content to which a user can subscribe;
providing a discovery button in a Web browser's chrome;
responsive to the acts of parsing and providing, independent of user input with respect to specific feed content on the webpage, visually altering the discovery button in the Web browser's chrome to notify the user that the content to which the user can subscribe has been identified, the discovery button being selectable to present a list of the content to which the user can subscribe, the Web browser being configured to automatically scroll to a particular piece of content on the webpage based on a user action, relative to the list of the content to which the user can subscribe, to identify the particular piece of content, the list comprising multiple different selectable menu items that each include less than all of the content to which the Web browser is configured to scroll;
detecting a cursor over or near content to which the user can subscribe; and
responsive to said detecting and independent of a user selecting the content, presenting a user interface instrumentality that can enable a user to subscribe to the content.

2. The computer-implemented method of claim 1, wherein said detecting and presenting are performed by a Web browser.

3. The computer-implemented method of claim 1, wherein the user interface instrumentality comprises a clickable button.

4. The computer-implemented method of claim 1, wherein the user interface instrumentality comprises a clickable button that can enable a user to automatically subscribe to the content.

5. The computer-implemented method of claim 1, wherein the user interface instrumentality comprises a clickable button that can be clicked to present a dialog that enables the user to subscribe to the content.

6. The computer-implemented method of claim 1, wherein the user interface instrumentality comprises an audible sound.

7. The computer-implemented method of claim 1, wherein the user interface instrumentality comprises a physical feedback mechanism.

8. The computer-implemented method of claim 1 further comprising visually highlighting the content to which the user can subscribe.

9. The computer-implemented method of claim 1, wherein the user interface instrumentality comprises a clickable button that is configured to present a menu of functionalities when clicked by the user.

10. The computer-implemented method of claim 9, wherein the menu of functionalities comprises multiple different functionalities that can each be performed relative to the content.

11. A computer-implemented method comprising:
receiving HyperText Markup Language (HTML) code associated with a webpage;
parsing the HTML code to identify content having functionality that can be performed relative to the content, the functionality comprising subscription functionality and functionality other than the subscription functionality;
providing a discovery button in a Web browser's chrome;

responsive to the acts of parsing and providing, visually altering the discovery button in the Web browser's chrome, independent of and without requiring any user action other than loading the webpage, to notify a user that the content has been identified, the discovery button being selectable to present a list of identified content, the Web browser being configured to automatically scroll to a particular piece of content on the webpage based on a user action relative to the list of identified content to identify the particular piece of content, the list comprising multiple different menu item selections that each include less than all of the identified content to which the Web browser can scroll;

detecting a cursor over or near identified content having said functionality; and responsive to said detecting, and independent of the user selecting the content, presenting a user interface instrumentality in the form of a clickable button that can be clicked by a user to access said functionality.

12. The computer-implemented method of claim 11, wherein said subscription functionality can enable a user to subscribe to identified content.

13. The computer-implemented method of claim 11, wherein said clickable button is configured to present a dialog when clicked by the user.

14. The computer-implemented method of claim 11, wherein said clickable button is configured to present a menu of functionalities when clicked by the user.

15. The computer-implemented method of claim 11, wherein the functionality other than the subscription functionality comprises at least one of a map functionality, a definition functionality, a copy functionality, or an e-mail functionality.

16. A system comprising:

one or more computer readable storage media devices;

computer readable instructions embodied on the one or more computer readable storage media devices which, when executed, implement a Web browser configured to:

receive HyperText Markup Language (HTML) code associated with a webpage;

parse the HTML code to identify content having functionality that can be performed relative to the content, the functionality comprising subscription functionality and functionality other than the subscription functionality;

provide a discovery button in a Web browser's chrome;

responsive to parsing the HTML code and providing the discovery button, visually alter the discovery button in the Web browser's chrome, independent of and without requiring any user action other than loading the webpage, to notify a user that the content has been identified, the discovery button being selectable to present a list of identified content, the Web browser being configured to automatically scroll to a particular piece of content on the webpage based on a user action relative to the list of identified content to identify the particular piece of content, the list comprising multiple different menu item selections that each include less than all of the identified content to which the Web browser can scroll;

detect a hover over or near identified content having said functionality; and responsive to detecting the hover, and independent of the user selecting the content, present a user interface instrumentality for accessing said functionality.

17. The system of claim 16, wherein said subscription functionality can enable a user to subscribe to identified content.

18. The system of claim 16, wherein said accessing is configured to present a dialog when clicked by the user.

19. The system of claim 16, wherein said accessing is configured to present a menu of functionalities when clicked by the user.

20. The system of claim 16, wherein the functionality other than the subscription functionality comprises at least one of a map functionality, a definition functionality, a copy functionality, or an e-mail functionality.

* * * * *